US012802837B2

(12) United States Patent
Wilkowski et al.

(10) Patent No.: US 12,802,837 B2
(45) Date of Patent: Nov. 17, 2026

(54) COMPACT MAGNETO-OPTICAL TRAP WITH THERMAL ABLATION

(71) Applicants: Nanyang Technological University, Singapore (SG); National University of Singapore, Singapore (SG); Université Côte D'azur (UCA), Nice (FR); Centre National De La Recherche Scientifique, Paris (FR); Sorbonne Universite, Paris (FR)

(72) Inventors: David Paul Maxime Wilkowski, Singapore (SG); Chung Chuan Hsu, Singapore (SG); Chang Chi Kwong, Singapore (SG)

(73) Assignees: NANYANG TECHNOLOGICAL UNIVERSITY, Singapore (SG); NATIONAL UNIVERSITY OF SINGAPORE, Singapore (SG); CENTRE NATIONAL DE LA RECHERCHE SCIENTIFIQUE, Paris (FR); UNIVERSITE COTE D'AZUR (UCA), Nice (FR); SORBONNE UNIVERSITE, Paris (FR)

( * ) Notice: Subject to any disclaimer, the term of this patent is extended or adjusted under 35 U.S.C. 154(b) by 283 days.

(21) Appl. No.: 18/684,263

(22) PCT Filed: Aug. 26, 2022

(86) PCT No.: PCT/SG2022/050612

§ 371 (c)(1),
(2) Date: Feb. 16, 2024

(87) PCT Pub. No.: WO2023/027642

PCT Pub. Date: Mar. 2, 2023

(65) Prior Publication Data

US 2025/0029745 A1 Jan. 23, 2025

(30) Foreign Application Priority Data

Aug. 27, 2021 (SG) ........................... 10202109397X

(51) Int. Cl.
*G21K 1/30* (2026.01)
*G06N 10/40* (2022.01)

(52) U.S. Cl.
CPC ............... *G21K 1/30* (2026.01); *G06N 10/40* (2022.01)

(58) Field of Classification Search
CPC ................................. G21K 1/30; G06N 10/40
See application file for complete search history.

(56) References Cited

U.S. PATENT DOCUMENTS

2002/0166960 A1* 11/2002 Pronko .................. B01D 59/44 250/282
2017/0105276 A1* 4/2017 Kock ........................ G04F 5/14
(Continued)

FOREIGN PATENT DOCUMENTS

WO 2015145136 A2 10/2015

OTHER PUBLICATIONS

Kock et al., "Laser Controlled Atom Source For Optical Clocks", Sci. Rep, Nov. 18, 2016, vol. 6, 37321:1-6 (Year: 2016).*
(Continued)

*Primary Examiner* — David E Smith
(74) *Attorney, Agent, or Firm* — Patterson + Sheridan, LLP

(57) ABSTRACT

Disclosed herein is a method of generating and trapping laser cooled metal atoms in a magneto-optical trap, the method comprising (a) providing an apparatus comprising a vacuum chamber, a magneto-optical trap arranged to be generated within the vacuum chamber, and an ablation laser, (b) placing an elemental metal sample within the vacuum chamber and then generating a vacuum within the vacuum (Continued)

Figure 1:
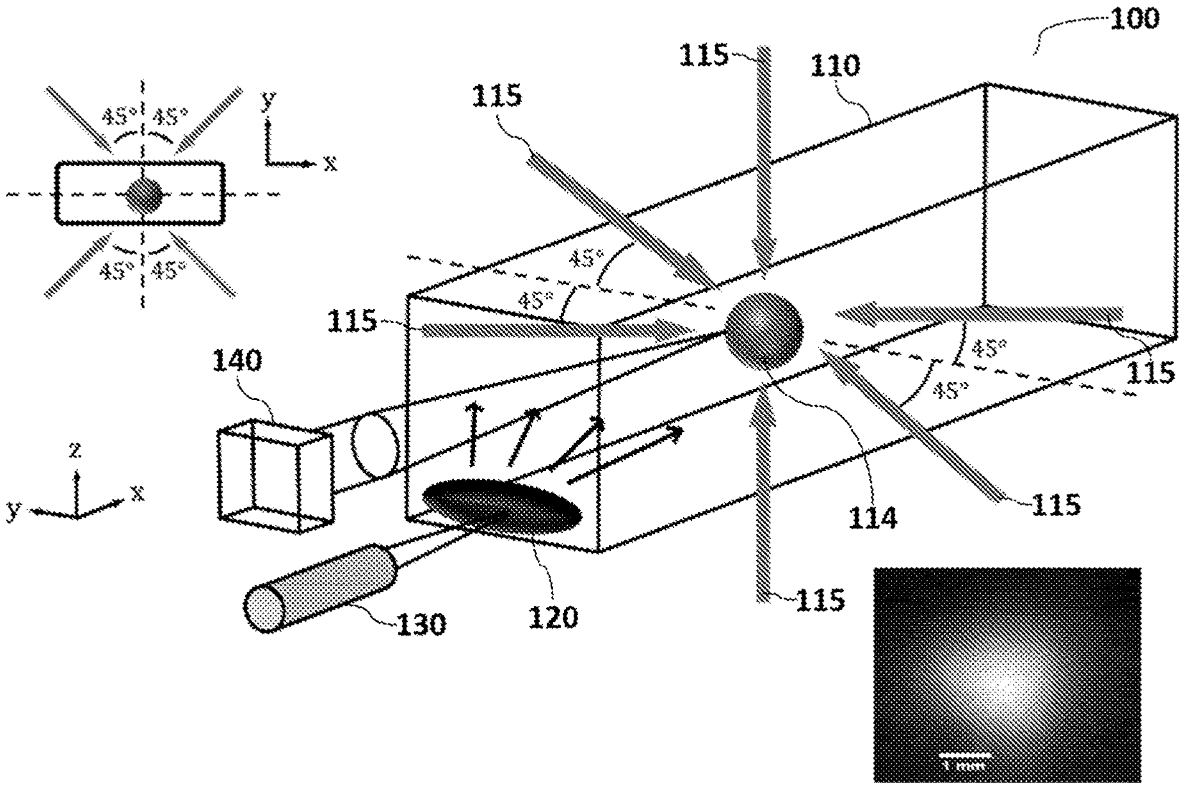

chamber, (c) irradiating the elemental metal sample with the ablation laser to generate an atomic vapour formed of elemental metal atoms from the elemental metal sample, and (d) trapping a plurality of the elemental metal atoms in the magneto-optical trap. Also disclosed herein is an apparatus for capturing cold elemental metal atoms, the apparatus comprising a vacuum chamber, an apparatus that generates a magneto-optical trap within the vacuum chamber, an ablation laser, and an elemental metal sample holder, wherein the elemental metal sample holder is situated within the vacuum chamber at a location that does not require the ablation laser to pass through the magneto-optical trap.

20 Claims, 5 Drawing Sheets

(56) References Cited

U.S. PATENT DOCUMENTS

2018/0292786 A1* 10/2018 Sakai .................. G03H 1/0005
2021/0049494 A1* 2/2021 King ...................... G06N 20/20

OTHER PUBLICATIONS

Baum et al., "1-D Magneto-Optic Trap of Polyatomic Molecules", Physical Review Letters, 2020, vol. 124, No. 13 (Year: 2020).*
Yasuda et al., "Laser-Controlled Cold Ytterbium Atom Source for Transportable Optical Clocks", J. Phys. Soc. Jpn. 2017, vol. 86, 125001-(1-2) (Year: 2017).*
International Search Report and Written Opinion in related application PCT/SG2022/050612 dated Apr. 25, 2023.
Baum L. et al., 1 D Magneto-Optical Trap of Polyatomic Molecules. Physical Review Letters, Mar. 31, 2020, vol. 124, No. 13, 133201-(1-6) [Retrieved on Apr. 24, 2023] <DOI: 10.1103/PHYSREVLETT.124.133201 > Whole document.
Hemmerling B. et al., Buffer gas loaded magneto-optical traps for Yb, Tm, Er and Ho. New Journal of Physics, Jun. 30, 2014, vol. 16, 063070:1-12 [Retrieved on Apr. 24, 2023] <DOI: 10.1088/1367-2630/16/6/063070> Whole document.
Kock O. et al., Laser controlled atom source for optical clocks. Sci Rep., Nov. 18, 2016, vol. 6, 37321 : 1-6 [Retrieved on Apr. 24, 2023] <DOI: 10.1038/SREP37321 > Whole document.
Yasuda M. et al., Laser-Controlled Cold Ytterbium Atom Source for Transportable Optical Clocks. J. Phys. Soc. Jpn., Nov. 28, 2017, vol. 86, 125001-(1-2) [Retrieved on Apr. 24, 2023] <DOI: 10.7566/JPSJ.86.125001> Whole document.
Hsu C. et al., Laser-induced thermal source for cold atoms. Sci Rep., Jan. 18, 2022, vol. 12, No. 1, 868: 1-6 [Retrieved on Apr. 24, 2023] <DOI: 10.1038/S41598-021-04697-4> Whole document.
Young et al.; Half-minute-scale atomic coherence and high relative stability in a tweezer clock, Nature, 588(7838), 408-413 (2020).
Barbiero, et al.; Sideband-enhanced cold atomic source for optical clocks. Phys. Rev. Appl. 13, 014013 (2020).
Baum, et al.; 1D magneto-optical trap of polyatomic molecules. Phys. Rev. Lett. 124, 133201 (2020).
Beaufils, Q. et al.; All-optical production of chromium Bose—Einstein condensates. Phys. Rev. A 77, 061601 (2008).
Bradley, C. et al.; Magneto-optical trapping of chromium atoms. Phys. Rev. A 61, 053407 (2000).
Cheiney, et al.; Zeeman slowers made simple with permanent magnets in a Halbach configuration. arXiv preprint arXiv: 1101. 3243 (2011).
Chichkov, et al.; Femtosecond, picosecond and nanosecond laser ablation of solids. Appl. Phys. A 63, 109-115 (1996).
Chu, et al.; Experimental observation of optically trapped atoms. Phys. Rev. Lett. 57, 314 (1986).
Chu, et al.; Three-dimensional viscous confinement and cooling of atoms by resonance radiation pressure. Phys. Rev. Lett. 55, 48 (1985).
Cohen, et al.; Quantum computing with circular Rydberg atoms. arXiv preprint arXiv: 2103. 12744 (2021).
De, et al.; Magneto-optical trapping of barium. Phys. Rev. A 79, 041402 (2009).
Raab et al.; Trapping of Neutral Sodium Atoms with Radiation Pressure, Phys. Rev. Lett., 59(23), 2631-2634 (1987).
E. Wodey et al.; A robust, high-flux source of laser-cooled ytterbium atoms, J. Phys. B: At. Mol. Opt. Phys., 54(3) 035301 (2021).
Golovizin, A. et al.; Inner-shell clock transition in atomic thulium with a small blackbody radiation shift. Nat. Commun. 10, 1-8 (2019).
Grotti, J. et al.; Geodesy and metrology with a transportable optical clock. Nat. Phys. 14, 437-441 (2018).
Grünert, J. & Hemmerich, A. Sub-Doppler magneto-optical trap for calcium. Phys. Rev. A 65, 041401 (2002).
Guest, J. R. et al.; Laser Trapping of 225Ra and 226Ra with Repumping by Room-Temperature Blackbody Radiation. Phys. Rev. Lett. 98, 093001 (2007).
Hemmerling, et al.; Buffer gas loaded magneto-optical traps for Yb, Tm, Er and Ho. New J. Phys. 16, 063070 (2014).
Madjarov et al.; High-fidelity entanglement and detection of alkaline-earth Rydberg atoms, Nat. Phys. 16(8), 857-861 (2020).
Ilzhöfer, et al.; Two-species five-beam magneto-optical trap for erbium and dysprosium. Phys. Rev. A 97, 023633 (2018).
Inoue et al.; Magneto-optical trapping of optically pumped metastable europium. Phys. Rev. A 97, 061607 (2018).
Katori, et al.; Magneto-optical trapping and cooling of strontium atoms down to the photon recoil temperature. Phys. Rev. Lett. 82, 1116 (1999).
Kim et al.; Buffer-gas loading and magnetic trapping of atomic europium. Phys. Rev. Lett. 78, 3665 (1997).
Lamporesi, et al.; Compact high-flux source of cold sodium atoms. Rev. Sci. Instrum. 84, 063102 (2013).
Leibrandt, et al.; Laser ablation loading of a surface-electrode ion trap. Phys. Rev. A 76, 055403 (2007).
Loo, et al.; Investigations of a two-level atom in a magneto-optical trap using magnesium. J. Opt. B Quantum Semiclass. Opt. 6, 81 (2004).
Maruyama, et al.; Investigation of sub-Doppler cooling in an ytterbium magneto-optical trap. Phys. Rev. A 68, 011403 (2003).
Miao, et al.; Magneto-optical trapping of holmium atoms. Phys. Rev. A 89, 041401 (2014).
Mitra, et al.; Direct laser cooling of a symmetric top molecule. Science 369, 1366-1369 (2020).
Miyazawa, et al.; Narrow-line magneto-optical trap for europium. Phys. Rev. A 103, 053122 (2021).
Kock et al.; Laser controlled atom source for optical clocks, Sci Rep, 6(1), 37321 (2016).
Olmschenk, et al.; Laser ablation production of Ba, Ca, Dy, Er, La, Lu, and Yb ions. Appl. Phys. B 123, 99 (2017).
Osada, et al.; loading of a single strontium ion into a surface electrode trap using pulsed laser ablation. arXiv preprint arXiv: 2109. 04965 (2021).
Poli, et al.; A transportable strontium optical lattice clock. Appl. Phys. B 117, 1107-1116 (2014).
Saffman; Quantum computing with atomic qubits and Rydberg interactions: Progress and challenges. J. Phys. B At. Mol. Opt. Phys. 49, 202001 (2016).
Yang , et al.; A high flux source of cold strontium atoms, Eur. Phys. J. D, 69(10), 226 (2015).
Takamoto, et al.; Test of general relativity by a pair of transportable optical lattice clocks. Nat. Photon. 14, 411-415 (2020).
Tarallo, et al.; BaH molecular spectroscopy with relevance to laser cooling. Phys. Rev. A 93, 032509 (2016).
Vrijsen, et al.; Efficient isotope-selective pulsed laser ablation loading of 174Yb+ ions in a surface electrode trap. Opt. Express 27, 33907-33914 (2019).
Yasuda, et al.; Laser-controlled cold ytterbium atom source for transportable optical clocks. J. Phys. Soc. Jpn. 86, 125001 (2017).

(56) References Cited

OTHER PUBLICATIONS

Youn, et al.; Dysprosium magneto-optical traps . . . Phys. Rev. A 82, 043425 (2010).
Zimmermann, et al.; Laser ablation loading of a radiofrequency ion trap. Appl. Phys. B 107, 883-889 (2012).
Cheiney, et al.; A Zeeman slower design with permanent magnets in a Halbach configuration Rev. Sci. Instrum. 82, 063115 (2011).
Young, et al.; A tweezer clock with half-minute atomic coherence at optical frequencies and high relative stability arXiv:2004.06095 (2020).
Cohen, et al.; Quantum computing with circular Rydberg atoms. PRX Quantum 2, 030322 (2021).
Osada; A. Deterministic loading of a single strontium ion into a surface electrode trap using pulsed laser ablation. J. Phys. Commun. 6 , 15007 (2022).

* cited by examiner

COMPACT MAGNETO-OPTICAL TRAP WITH THERMAL ABLATION

FIELD OF INVENTION

The invention relates to a simple, compact and general experimental apparatus suitable for cooling and trapping a wide range of atomic species in a magneto-optical trap (MOT).

BACKGROUND

The listing or discussion of a prior-published document in this specification should not necessarily be taken as an acknowledgement that the document is part of the state of the art or is common general knowledge.

Over the last decades, laser cooling and trapping has become a pivotal technique for quantum technologies such as quantum information, quantum sensing, time keeping, and quantum computing. The cold atomic gas is initially produced in a MOT where three pairs of counter-propagating circularly polarised laser beams (one pair per spatial dimension), are overlapped at the centre of a static magnetic quadrupole field. More manipulations are often necessary, such as further cooling, and/or loading into optical lattices or optical tweezers for advanced applications.

In its early years, cold atoms were produced in a single vacuum chamber containing a thermal vapour at room temperature. Despite its simplicity, the setup has two drawbacks: first, the residual pressure limits the cold cloud lifetime and might prevent further manipulations. Second, the single vacuum chamber can only be implemented solely with alkali atoms which are the only species with suitable saturated vapour pressure at room temperature.

To overcome the drawbacks mentioned above, the vacuum apparatus became more complex to accommodate the cold gas production in an ultrahigh vacuum environment where the thermal vapour is extracted from another part of the system. Usually, a narrow tube connects both parts of the system to maintain a good differential pressure.

Since most atomic metals used today for laser cooling and trapping have a low saturation pressure at room temperature, a typical atomic source consists of an effusive thermal atomic beam which is extracted from a high temperature oven. Some examples of cold atoms produced from oven source include atomic species like alkaline-earth metals (Mg, Ca, Sr, Ba, Ra), lanthanides (Eu, Dy, Ho, Er, Tm, Yb), and transition metals (Cr). Due to the high longitudinal velocity of the hot atomic beam, a Zeeman slower is often required between the oven and the final MOT. In some cases, a two-dimensional MOT is further inserted after the Zeeman slower to collimate and deflect the atomic beam, leading to an improvement in the loading rate of MOT and the vacuum environment in the science chamber. While the performance of such a system in terms of atoms number and lifetime is excellent, the experimental setups are bulky and usually require substantial maintenance efforts, which increases the challenges to operate cold atoms platforms outside dedicated laboratories.

Besides using an oven source, it is also possible to use laser ablation of a target sample as a source for neutral atoms, ions, and molecules. Recently, with the aim of simplifying the setups, laser-controlled sources have been developed for cold strontium (Kock, O. et al., *Sci. Rep.* 2016, 6, 1-6) and ytterbium (Yasuda, M. et al., *J. Phys. Soc. Jpn.* 2017, 86, 125001). In these studies, the targets are oxides of strontium or ytterbium, and the dominant mechanism to release the atoms involves a photochemical process. This process has the advantage of requiring moderate laser power (i.e. in the milliwatt range) but leads to an undesirable release of oxygen as a by-product, which contributes to a higher background pressure that limits the lifetime of the cold gas.

Therefore, there exists a need to discover new methods and apparatus for the ablation process to overcome the challenges stated above.

SUMMARY OF INVENTION

Aspects and embodiments of the invention will now be described by reference to the following numbered clauses.

1. A method of generating and trapping laser cooled metal atoms in a magneto-optical trap, the method comprising:
   (a) providing an apparatus comprising:
      a vacuum chamber;
      a magneto-optical trap arranged to be generated within the vacuum chamber; and
      an ablation laser;
   (b) placing an elemental metal sample within the vacuum chamber and then generating a vacuum within the vacuum chamber;
   (c) irradiating the elemental metal sample with the ablation laser to generate an atomic vapour formed of elemental metal atoms from the elemental metal sample; and
   (d) trapping a plurality of the elemental metal atoms in the magneto-optical trap, wherein:
      the wavelength of the ablation laser is from 400 to 2,000 nm;
      the ablation laser has a power of from 1 to 100 W; and
      a duration of the irradiation is from 0.1 ms to 5 seconds.
2. The method according to Clause 1, wherein:
   the ablation laser has a power of from 1 to 30 W; and/or
   the duration of the irradiation is from 100 ms to 5 seconds.
3. The method according to Clause 2, wherein:
   the ablation laser has a power of from 10 to 23 W; and/or
   the duration of the irradiation is from 2 to 4 seconds.
4. The method according to Clause 3, wherein:
   the ablation laser has a power of from 15 to 20 W; and/or
   the duration of the irradiation is from 2.5 to 3 seconds.
5. The method according to any one of the preceding clauses, wherein the total number of metal atoms trapped is in the order of from $1\times10^6$ to $1\times10^7$, such as about 3.5 million atoms.
6. The method according to Clause 1, wherein:
   the ablation laser has a power of from greater than 30 to 100 W; and/or
   the duration of the irradiation is from 0.1 ms to less than 1 second.
7. The method according to Clause 6, wherein:
   the ablation laser has a power of from 32 to 75 W; and/or
   the duration of the irradiation is from 1 ms to 100 ms.
8. The method according to Clause 7, wherein:
   the ablation laser has a power of from 34 to 50 W; and/or
   the duration of the irradiation is from 5 ms to 50 ms.
9. The method according to Clause 8, wherein:
   the ablation laser has a power of from 35 to 40 W, such as 38 W; and/or
   the duration of the irradiation is from 10 ms to 30 ms, such as about 25 ms.
10. The method according to any one of Clauses 1 and 6 to 9, wherein the total number of metal atoms trapped is in the order of from $1\times10^3$ to $1\times10^5$, such as in the order of $1\times10^4$.

11. The method according to any one of the preceding clauses, wherein the elemental metal sample is selected from one of group 13 (group III) elements, alkali metals, alkaline earth metals, lanthanides, and transition metals, optionally wherein the elemental metal sample is selected from one of alkali metals, alkaline earth metals, lanthanides, and transition metals.

12. The method according to Clause 11, wherein the elemental metal sample is selected from indium, lithium, sodium, magnesium, calcium, strontium, barium, radium, europium, dysprosium, erbium, holmium, thulium, ytterbium, titanium, chromium, iron, and ruthenium, optionally wherein the elemental metal sample is selected from lithium, sodium, magnesium, calcium, strontium, barium, radium, europium, dysprosium, erbium, holmium, thulium, ytterbium, titanium, chromium, iron, and ruthenium.

13. The method according to Clause 12, wherein the elemental metal sample is strontium.

14. The method according to any one of the preceding clauses, wherein the ablation laser has a wavelength of from 500 to 1,500 nm, such as from 750 to 1,250 nm, such as from 1,000 to 1,100 nm, such as about 1,064 nm.

15. The method according to any one of the preceding clauses, wherein the ablation laser generates an ablation spot on the elemental metal sample, where the ablation spot has a size of from 1 to 100 μm.

16. The method according to any one of the preceding clauses, wherein the vacuum chamber provides a vacuum that is less than or equal to $1\times10^{-8}$ mbar.

17. The method according to any one of the preceding clauses, wherein the ablation laser has direct line-of-sight to the elemental metal sample.

18. The method according to any one of Clauses 1 to 16, wherein the ablation laser is redirected and focused onto the elemental metal sample by a mirror situated within the vacuum chamber.

19. The method according to any one of the preceding clauses, wherein the magneto-optical trap is formed in part within the vacuum chamber by three pairs of mutually orthogonal laser beams, each of which has a wavelength corresponding to a cooling transition of the elemental metal sample, optionally wherein:

each of the lasers has a wavelength of from 230 to 1,500 nm, such as from 300 to 1,000 nm; and/or the three pairs of orthogonal laser beams have a total power of from 50 to 1,000 mW.

20. An apparatus for capturing cold elemental metal atoms, the apparatus comprising:

a vacuum chamber;

an apparatus that generates a magneto-optical trap within the vacuum chamber;

an ablation laser; and an elemental metal sample holder, wherein the elemental metal sample holder is situated within the vacuum chamber at a location that does not require the ablation laser to pass through the magneto-optical trap.

21. The apparatus according to Clause 20, wherein the vacuum chamber has a protruding housing and houses the elemental metal sample holder and a mirror, where the mirror is situated in the line of sight of a laser beam from the ablation laser such that it can direct and focus the laser beam onto an elemental metal sample when the apparatus is in use.

DRAWINGS

FIG. 1 depicts a strontium MOT in a vacuum chamber (rectangular cuboid). The filled arrows represent the 461 nm MOT beams that target the strontium cooling transition. The magnetic fields and repumper lasers are not shown here. Inset: sample image of the cold atoms cloud rendered in grey scale (size ~1.5 mm).

Figure 2:
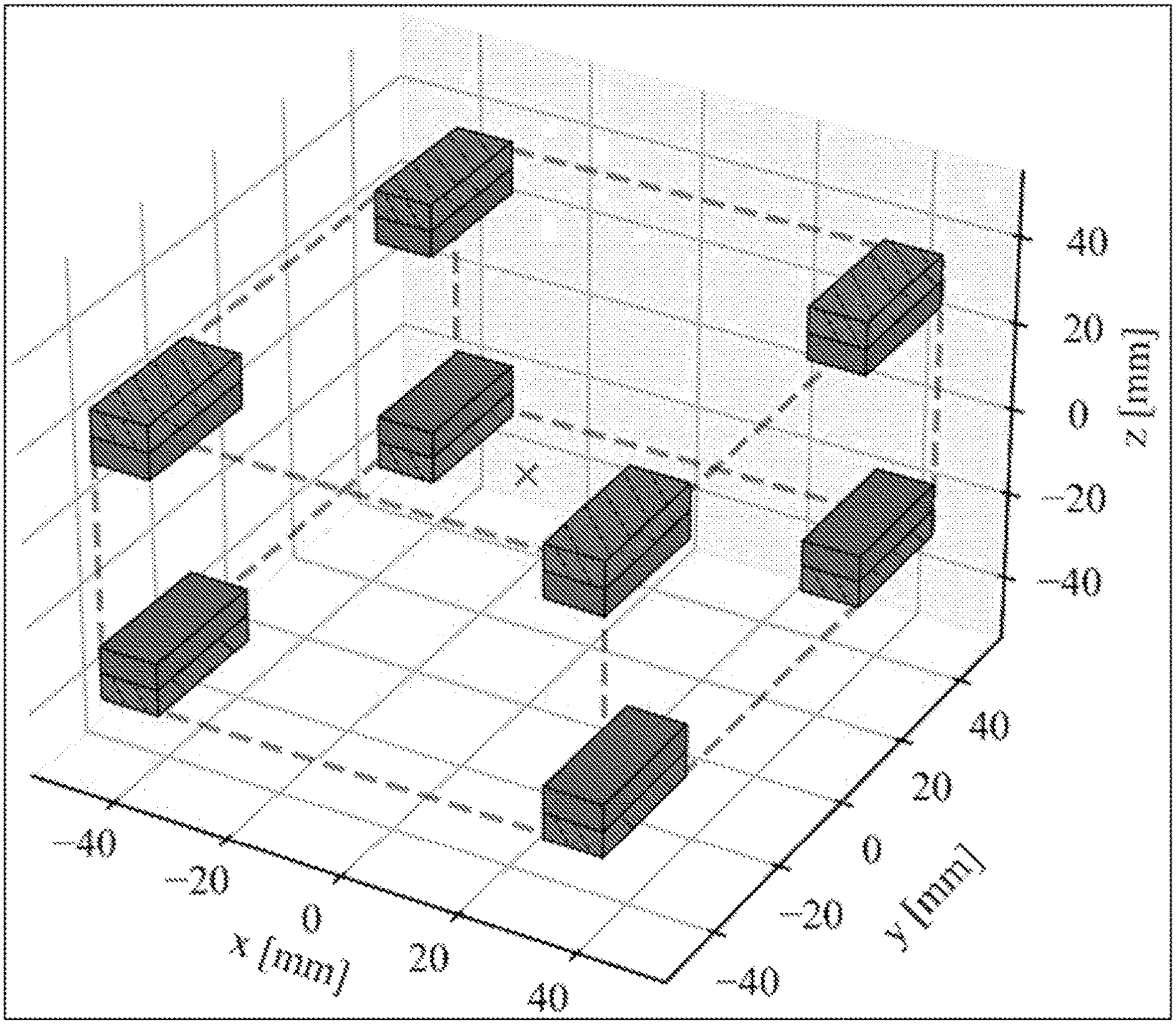

FIG. 2 depicts the configuration of magnets arranged on eight vertices of a cuboid (four magnets at each vertex). The shaded and solid patterns represent the two poles of the magnets. The magnetic field direction points from solid pattern to shaded pattern.

Figure 3:
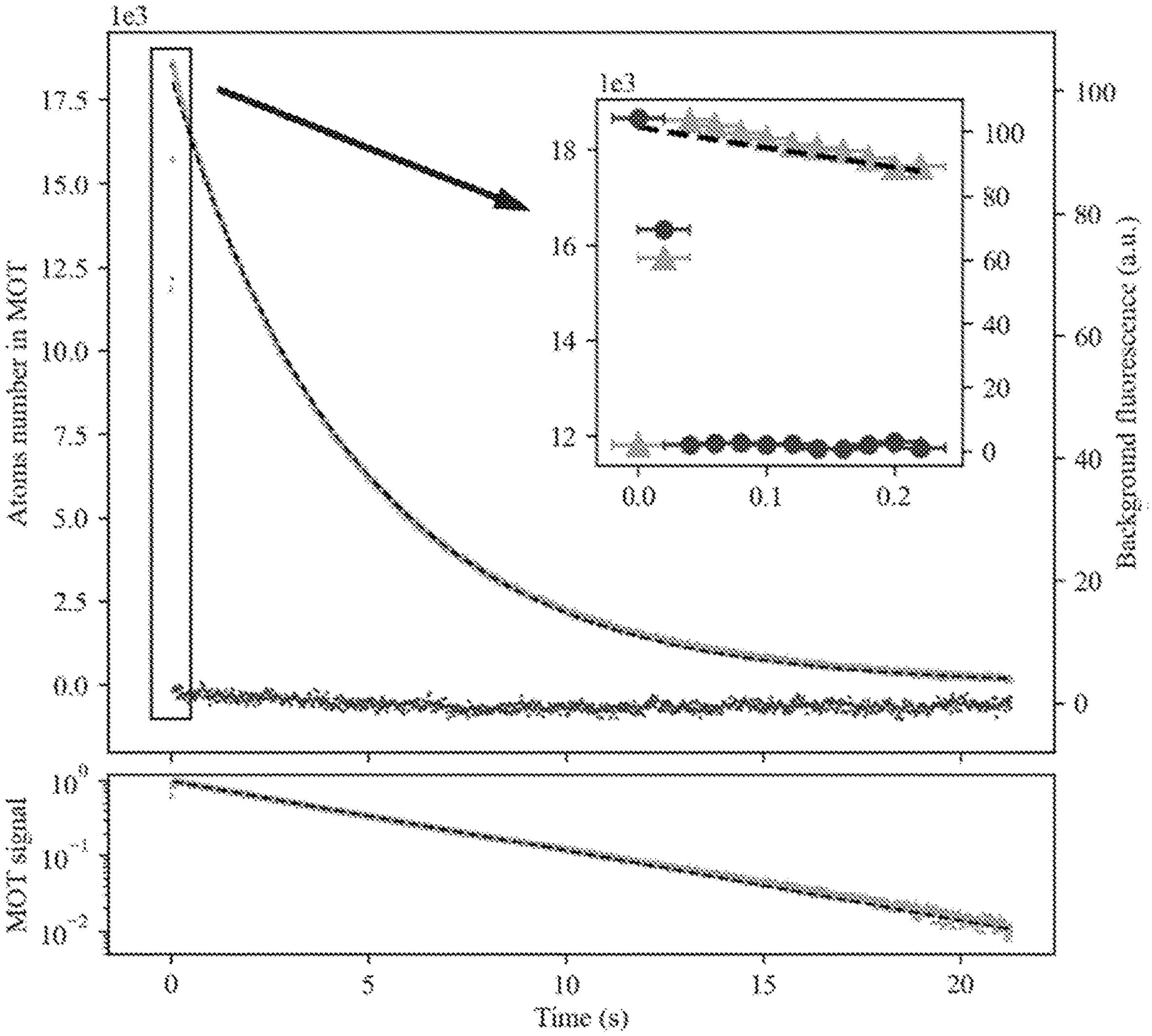

FIG. 3 depicts the experimental results of the short pulse sequence. Top panel: Temporal evolution of the cold atoms number (grey triangles) and the strontium vapour (black circles), averaged over 78 runs of the experiment. The time origin corresponds to the ignition of the ablation laser. The decaying part of the MOT signal was fitted to an exponential function (dashed line) to give a MOT lifetime of $\tau_N$~4.7(9) s. The uncertainty reflects one standard deviation of the lifetime measured over 1.5 h for the 78 runs of experiments. Inset: A zoom of the first 200 ms. The horizontal error bars reflect the temporal resolution of our measurement methods. The lifetime of the vapor and cold atoms in the MOT were determined to be 0.04 s and 4.7 s, respectively. Bottom panel: Normalized temporal evolution of the cold atoms fluorescence signal in semi-log scale.

Figure 4:
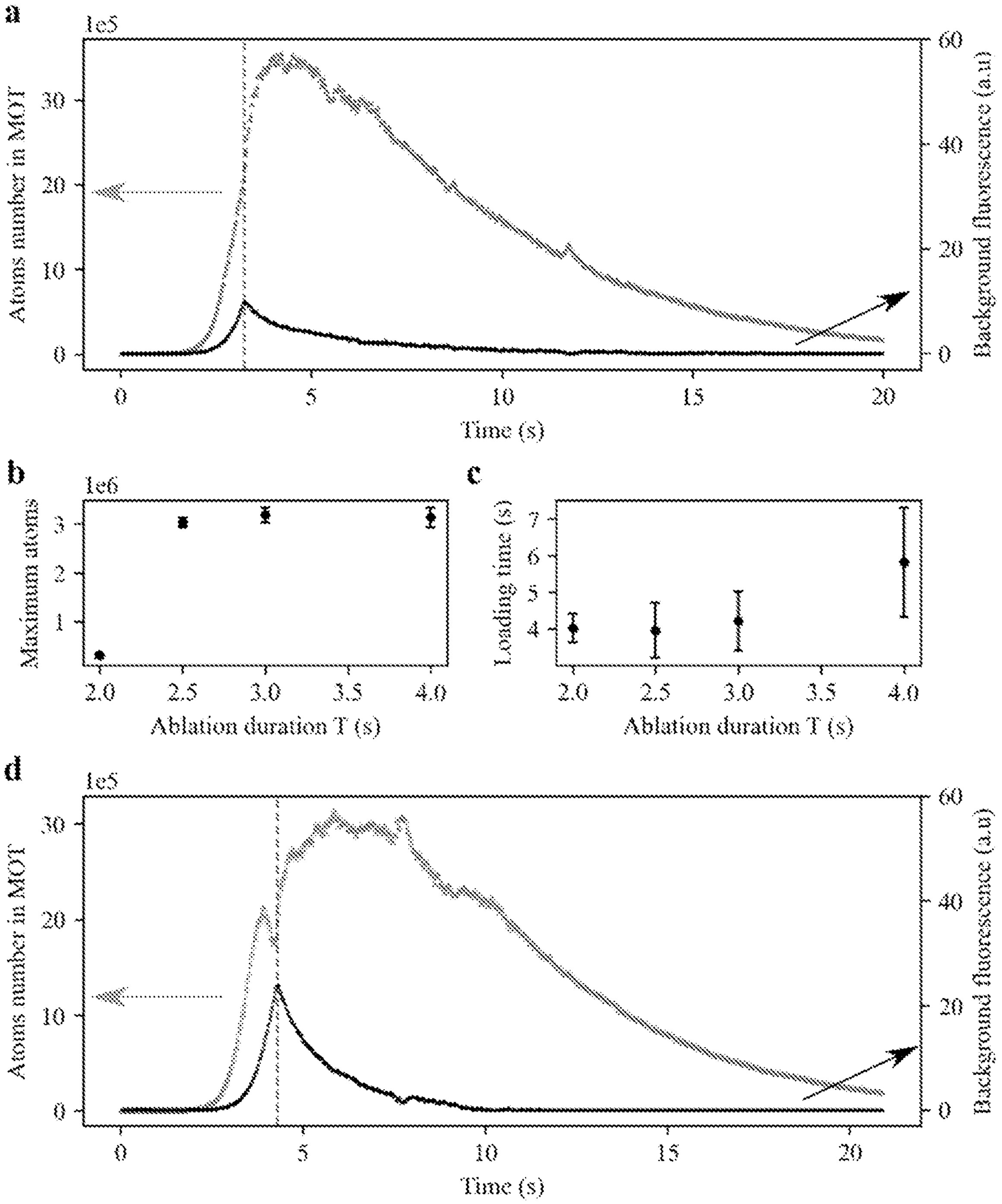

FIG. 4 depicts the experimental results of the long pulse sequence. (a) Number of atoms in the MOT (grey triangles) and the fluorescence signal of the background strontium vapour (black circles) for an ablation duration of 3 s; (b) Maximum number of atoms as a function of ablation duration. Fluorescence signals are observed when T≥2 s; (c) MOT loading time (time taken to reach the peak atoms number value after the ablation laser ignition) as a function of ablation duration; and (d) Number of atoms in the MOT (grey triangles) and the fluorescence signal of the background strontium vapour (black circles) for an ablation duration of 4 s. In all curves, the ablation laser power was 20 W. The vertical dashed line indicates the time at which the ablation laser was turned off. In (a) and (d), the time origin corresponds to the laser ablation ignition.

Figure 5:
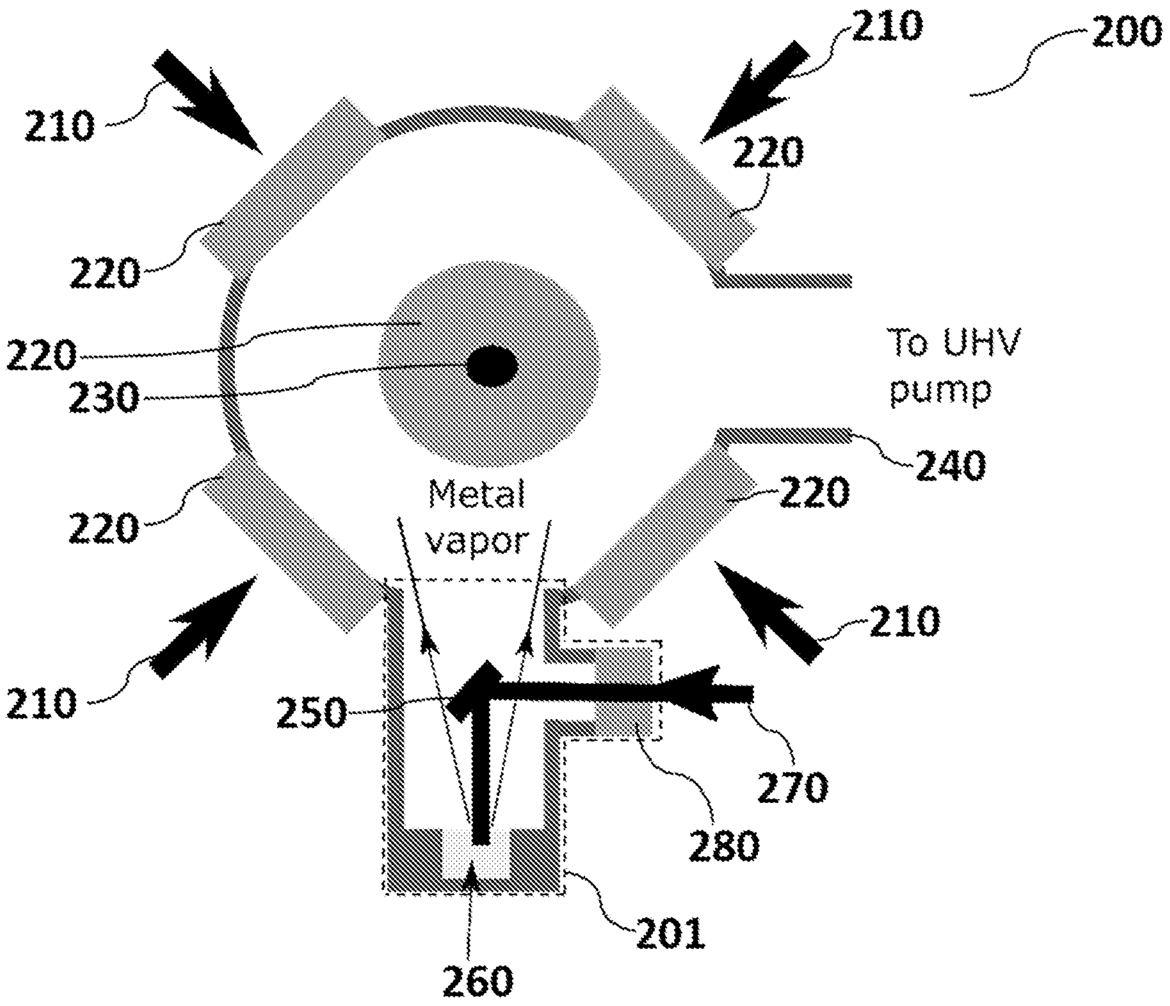

FIG. 5 depicts the apparatus design.

DESCRIPTION

Some or all of the problems identified herein have been surprisingly solved by the use of the apparatus and methods described herein. Thus, in a first aspect of the invention there is disclosed a method of generating and trapping laser cooled metal atoms in a magneto-optical trap, the method comprising:

(a) providing an apparatus comprising:

a vacuum chamber;

a magneto-optical trap arranged to be generated within the vacuum chamber; and an ablation laser;

(b) placing an elemental metal sample within the vacuum chamber and then generating a vacuum within the vacuum chamber;

(c) irradiating the elemental metal sample with the ablation laser to generate an atomic vapour formed of elemental metal atoms from the elemental metal sample; and (d) trapping a plurality of the elemental metal atoms in the magneto-optical trap, wherein:

the wavelength of the ablation laser is from 400 to 2,000 nm;

the ablation laser has a power of from 1 to 100 W; and a duration of the irradiation is from 0.1 ms to 5 seconds.

In embodiments herein, the word "comprising" may be interpreted as requiring the features mentioned, but not limiting the presence of other features. Alternatively, the word "comprising" may also relate to the situation where only the components/features listed are intended to be present (e.g. the word "comprising" may be replaced by the phrases "consists of" or "consists essentially of"). It is explicitly contemplated that both the broader and narrower interpretations can be applied to all aspects and embodiments of the present invention. In other words, the word "comprising" and synonyms thereof may be replaced by the phrase "consisting of" or the phrase "consists essentially of" or synonyms thereof and vice versa.

The method disclosed herein is suitable for use in ultracold gas, atomic, molecular, and optical (AMO) physics, and quantum technologies in general. More particular examples include, but are not limited to, optical frequency reference, quantum sensing, quantum computing, and quantum simulation.

FIG. 1 discloses an apparatus suitable for use in the methods disclosed herein and will be used to describe an embodiment of the above method. As depicted, the apparatus 100 of FIG. 1 includes a vacuum chamber 110, a magneto-optical trap 114 generated by six laser beams 115 and an ablation laser 130. The apparatus may also contain analytical equipment 140.

The vacuum chamber 110 is connected to one or more vacuum pumps (not shown). The pressure in the vacuum chamber 110 may be measured using any suitable means, such as a pressure gauge (not shown). In use, an elemental metal sample 120 is placed within the vacuum chamber at any suitable position (e.g. within a container or receptacle provided for this purpose; not shown). The vacuum chamber 110 is then evacuated until a sufficiently high vacuum has been established. Once a sufficiently high vacuum has been established in the vacuum chamber 110, an ablation laser 130 is focused on to the surface of the elemental metal sample 120. The frequency and intensity of the ablation laser, as well as the duration of the laser beam, are determined such that, in use, an atomic vapour is generated within the vacuum chamber, which vapour is then captured by the magneto-optical trap 114.

The ablation laser 130 is situated outside of the vacuum chamber 110 and the laser light from the ablation laser 130 is directed into the vacuum chamber 110 through a sufficiently optically transparent window (not shown). When the ablation laser 130 is activated and the laser beam is incident on and contacts the elemental metal sample 120, an atomic vapour of the elemental metal used in the sample is produced. When the ablation laser 130 is inactive, no atomic vapour is produced. The amount of atomic vapour produced may be a function of the flux of light emitted by the ablation laser 130. Thus, the amount of atomic vapour produced can be controlled by altering the flux of light that is incident on the elemental metal sample 120. For example, this can be controlled by altering the number of photons from the laser. The amount of vapour produced from any given area of the sample may also be changed by altering the total area of the sample onto which the laser energy is concentrated.

As will be appreciated, the laser light from the ablation laser 130 has a wavelength which is sufficiently absorbed to increase the thermal energy and break the bonds of the elemental metal sample 120 in order to generate an atomic vapour. For example, in the aspects and embodiments disclosed herein, the ablation laser may have a wavelength of from 400 to 2,000 nm, such as from 500 to 1,500 nm, such as from 750 to 1,250 nm, such as from 1,000 to 1,100 nm, such as about 1,064 nm.

As noted above, the ablation laser may be focused onto a particular area/size of the elemental metal sample, which may be referred to herein as an ablation spot. Any suitable size for the ablation spot may be used herein. For example, a suitable size for the ablation spot may be from 1 to 100 μm.

The ablation laser may have any suitable power and may be used to irradiate the elemental metal sample for any suitable length of time. For example, the ablation laser may have a power of from 1 to 100 W and an irradiation duration of from 0.1 ms to 5 seconds.

The ablation parameters chosen depend on the target's properties, such as surface details, absorption coefficient, heat capacity, heat conduction coefficient, and the sublimation/boiling point. The ablation laser power and spot size are crucial parameters. The methods disclosed herein cover two regimes: weak and strong heating. For weak heating, a low ablation laser power and long pulse duration are used, while for a strong heating regime, short pulses at high power are used.

The following lists typical parameter ranges for use in these methods (strong and weak heating) for strontium atoms.

Wavelength range: 400 nm to 2000 nm
Ablation power: 1 W to 100 W
Focused ablation spot size: 1 μm to 100 μm
Ablation duration: 0.1 ms to less than 1 s (e.g., 100 ms) (short pulses at strong heating regime)
100 ms to 5 s (long pulses at weak heating regime)

In certain embodiments, the ablation laser may be used at a higher power setting for a short period of time in order to generate a desired result. For example, the ablation laser may be operated at a power of from greater than 30 to 100 W, such as a power of from 32 to 75 W, such as a power of from 34 to 50 W, such as a power of from 35 to 40 W, such as 38 W, for a duration of from 0.1 ms to less than 1 second, such as from 1 ms to 100 ms, such as from 5 ms to 50 ms, such as from 10 ms to 30 ms, such as about 25 ms.

In embodiments where the ablation laser may be used at a higher power setting for a short period of time in order to generate a desired result, the desired result may be one in which the total number of metal atoms trapped may be in the order of from $1\times10^3$ to $1\times10^5$, such as in the order of $1\times10^4$. For example, using an ablation duration of 25 ms at an ablation power of 38 W resulted in a maximum number of atoms trapped of around 20 thousand atoms, with a lifetime of more than 4 s (e.g. around 5 s). While low, the number of atoms in this short pulse regime is already sufficiently high for studies involving, for example, Rydberg atoms that are proposed as a possible platform to implement quantum computing.

In alternative embodiments, the ablation laser may be used at a lower power setting for an extended period of time in order to generate a desired result. For example, the ablation laser may be operated at a power of from 1 to 30 W, such as from 10 to 23 W, such as from 15 to 20 W, for a duration of from 100 ms to 5 seconds, such as from 2 to 4 seconds, such as from 2.5 to 3 seconds, such as about 3.5 seconds. The desired result may be one in which the total number of metal atoms trapped may be in the order of from $1\times10^6$ to $1\times10^7$, such as about 3.5 million atoms. For example, when using an ablation power of 20 W and an ablation duration of 3 seconds, a total of around 3.5 million atoms were trapped inside the magneto-optical trap. This is over 100 times more atoms than in the short pulse regime discussed above. Applications where the trapping of a large number of atoms is useful include quantum simulation and quantum sensing applications.

In the above process, while an ablation time of longer than 4 seconds may be used, it is noted that this may result in the generation of too much atomic vapour, causing a dip in the number of trapped atoms. In addition, as shown in the examples below, a longer period of ablation may mean that it takes longer to reach the maximum number of atoms after the ablation laser is switched off. This is believed to be because the background pressure has to drop back to a reasonably low level before efficient loading of the magneto-optical trap can occur. As such, a duration of around 3 seconds may be optimal in embodiments using a lower power for the ablation laser.

For the lower power regime using a laser ablation duration of around 3 seconds, the resulting trapped atoms may have a trapping lifetime of over 4 seconds. Since there is no need for Zeeman slower and a 2D-MOT in the apparatus used for this method, a compact setup with less requirement for maintenance is possible. Importantly, this method allows one to use the laser induced thermal ablation (LITA) technique based on the thermal process of laser heating, and therefore, the actual wavelength for LITA should not be critical. In many cold atom experiments, a high-power laser is used to create a far-off-resonance trap of the cold atoms. This laser could also serve as the ablation laser for LITA, thus removing the need to maintain another laser.

While the methods disclosed in the examples herein make use of a constant ablation laser power, it might not be the best experimental strategy for applications requiring larger cold atoms number. Instead, one can think of a MOT loading sequence at a constant vapour pressure. To realize it, one should implement, for example, a decreasing temporal profile on the ablation laser power.

For the avoidance of doubt, it is explicitly contemplated that where a number of numerical ranges related to the same feature are cited herein, the end points for each range are intended to be combined in any order to provide further contemplated (and implicitly disclosed) ranges. Thus, from the above example, the following power ranges are explicitly contemplated:

- from 1 to 10 W, from 1 to 15 W, from 1 to 20 W, from 1 to 23 W, from 1 to 30 W, from 1 to 100 W;
- from 10 to 15 W, from 10 to 20 W, from 10 to 23 W, from 10 to 30 W, from 10 to 100 W;
- from 15 to 20 W, from 15 to 23 W, from 15 to 30 W, from 15 to 100 W;
- from 20 to 23 W, from 20 to 30 W, from 20 to 100 W;
- from 23 to 30 W, from 23 to 100 W; and
- from 30 to 100 W.

Any of the above ranges may be combined with any of the following duration ranges:

- from 0.1 ms to 1 ms, from 0.1 ms to 5 ms, from 0.1 ms to 10 ms, from 0.1 ms to 25 ms, from 0.1 ms to 30 ms, from 0.1 ms to 50 ms, from 0.1 ms to 100 ms, from 0.1 ms to less than 1 s, from 0.1 ms to 1 s, from 0.1 ms to 2 s, from 0.1 ms to 2.5 s, from 0.1 ms to 3 s, from 0.1 ms to 3.5 s, from 0.1 ms to 4 s, from 0.1 ms to 5 s;
- from 1 ms to 5 ms, from 1 ms to 10 ms, from 1 ms to 25 ms, from 1 ms to 30 ms, from 1 ms to 50 ms, from 1 ms to 100 ms, from 1 ms to less than 1 s, from 1 ms to 1 s, from 1 ms to 2 s, from 1 ms to 2.5 s, from 1 ms to 3 s, from 1 ms to 3.5 s, from 1 ms to 4 s, from 1 ms to 5 s;
- from 5 ms to 10 ms, from 5 ms to 25 ms, from 5 ms to 30 ms, from 5 ms to 50 ms, from 5 ms to 100 ms, from 5 ms to less than 1 s, from 5 ms to 1 s, from 5 ms to 2 s, from 5 ms to 2.5 s, from 5 ms to 3 s, from 5 ms to 3.5 s, from 5 ms to 4 s, from 5 ms to 5 s;
- from 10 ms to 25 ms, from 10 ms to 30 ms, from 10 ms to 50 ms, from 10 ms to 100 ms, from 10 ms to less than 1 s, from 10 ms to 1 s, from 10 ms to 2 s, from 10 ms to 2.5 s, from 10 ms to 3 s, from 10 ms to 3.5 s, from 10 ms to 4 s, from 10 ms to 5 s;
- from 25 ms to 30 ms, from 25 ms to 50 ms, from 25 ms to 100 ms, from 25 ms to less than 1 s, from 25 ms to 1 s, from 25 ms to 2 s, from 25 ms to 2.5 s, from 25 ms to 3 s, from 25 ms to 3.5 s, from 25 ms to 4 s, from 25 ms to 5 s;
- from 30 ms to 50 ms, from 30 ms to 100 ms, from 30 ms to less than 1 s, from 30 ms to 1 s, from 30 ms to 2 s, from 30 ms to 2.5 s, from 30 ms to 3 s, from 30 ms to 3.5 s, from 30 ms to 4 s, from 30 ms to 5 s;
- from 50 ms to 100 ms, from 50 ms to less than 1 s, from 50 ms to 1 s, from 50 ms to 2 s, from 50 ms to 2.5 s, from 50 ms to 3 s, from 50 ms to 3.5 s, from 50 ms to 4 s, from 50 ms to 5 s;
- from 100 ms to less than 1 s, from 100 ms to 1 s, from 100 ms to 2 s, from 100 ms to 2.5 s, from 100 ms to 3 s, from 100 ms to 3.5 s, from 100 ms to 4 s, from 100 ms to 5 s;
- from less than 1 s to 1 s, from less than 1 s to 2 s, from less than 1 s to 2.5 s, from less than 1 s to 3 s, from less than 1 s to 3.5 s, from less than 1 s to 4 s, from less than 1 s to 5 s;
- from 1 to 2 seconds, from 1 to 2.5 seconds, from 1 to 3 seconds, from 1 to 3.5 seconds, from 1 to 4 seconds, from 1 to 5 seconds;
- from 2 to 2.5 seconds, from 2 to 3 seconds, from 2 to 3.5 seconds, from 2 to 4 seconds, from 2 to 5 seconds;
- from 2.5 to 3 seconds, from 2.5 to 3.5 seconds, from 2.5 to 4 seconds, from 2.5 to 5 seconds;
- from 3 to 3.5 seconds, from 3 to 4 seconds, from 3 to 5 seconds;
- from 3.5 to 4 seconds, from 3.5 to 5 seconds; and
- from 4 to 5 seconds.

Any of the following duration ranges may be useful when a higher power setting is used:

- from 0.1 ms to 1 ms, from 0.1 ms to 5 ms, from 0.1 ms to 10 ms, from 0.1 ms to 25 ms, from 0.1 ms to 30 ms, from 0.1 ms to 50 ms, from 0.1 ms to 100 ms, from 0.1 ms to less than 1 s;
- from 1 ms to 5 ms, from 1 ms to 10 ms, from 1 ms to 25 ms, from 1 ms to 30 ms, from 1 ms to 50 ms, from 1 ms to 100 ms, from 1 ms to less than 1 s;
- from 5 ms to 10 ms, from 5 ms to 25 ms, from 5 ms to 30 ms, from 5 ms to 50 ms, from 5 ms to 100 ms, from 5 ms to less than 1 s;
- from 10 ms to 25 ms, from 10 ms to 30 ms, from 10 ms to 50 ms, from 10 ms to 100 ms, from 10 ms to less than 1 s;
- from 25 ms to 30 ms, from 25 ms to 50 ms, from 25 ms to 100 ms, from 25 ms to less than 1 s;
- from 30 ms to 50 ms, from 30 ms to 100 ms, from 30 ms to less than 1 s;
- from 50 ms to 100 ms, from 50 ms to less than 1 s; and
- from 100 ms to less than 1 s.

Any of the following duration ranges may be useful when a lower power setting is used:

- from 100 ms to 1 second, from 100 ms to 2 seconds, from 100 ms to 2.5 seconds, from 100 ms to 3 seconds, from 100 ms to 3.5 seconds, from 100 ms to 4 seconds, from 100 ms to 5 seconds;

from 1 to 2 seconds, from 1 to 2.5 seconds, from 1 to 3 seconds, from 1 to 3.5 seconds, from 1 to 4 seconds, from 1 to 5 seconds;

from 2 to 2.5 seconds, from 2 to 3 seconds, from 2 to 3.5 seconds, from 2 to 4 seconds, from 2 to 5 seconds;

from 2.5 to 3 seconds, from 2.5 to 3.5 seconds, from 2.5 to 4 seconds, from 2.5 to 5 seconds;

from 3 to 3.5 seconds, from 3 to 4 seconds, from 3 to 5 seconds;

from 3.5 to 4 seconds, from 3.5 to 5 seconds; and from 4 to 5 seconds.

The above applies to any set of numerical ranges disclosed herein.

The elemental metal sample may be any suitable material. For example, the elemental metal sample may be selected from one of group 13 (group III) elements, alkali metals, alkaline earth metals, lanthanides, and transition metals. For example, the elemental metal sample may be selected from one of alkali metals, alkaline earth metals, lanthanides, and transition metals. In particular embodiments that may be mentioned herein, the elemental metal sample is selected from indium, lithium, sodium, magnesium, calcium, strontium, barium, radium, europium, dysprosium, erbium, holmium, thulium, ytterbium, titanium, chromium, iron, and ruthenium. For example, the elemental metal sample may be selected from lithium, sodium, magnesium, calcium, strontium, barium, radium, europium, dysprosium, erbium, holmium, thulium, ytterbium, titanium, chromium, iron, and ruthenium. In certain embodiments, the elemental metal sample may be strontium. As will be appreciated, the materials used herein are the elemental material and not metal oxides or other compounds thereof. It has been surprisingly found that the use of elemental metals enables the generation of a dense atomic vapour in the apparatus and methods described herein, while minimising the risk of losing the cooled metal atoms from the magneto-optical trap due to the presence of other atoms (e.g. oxygen) that can knock out the desired metal atoms from the magneto-optical trap.

The vacuum used in the method may be any suitable vacuum, as stated above. For example, the vacuum chamber may be pumped down to a pressure that is less than or equal to $1\times10^{-8}$ mbar.

The ablation laser may be positioned to have a direct line-of-sight of the elemental metal sample. A device that uses such an arrangement is depicted in FIG. 1. Alternatively, the ablation laser may be redirected and focused onto the elemental metal sample by a mirror situated within the vacuum chamber. Such an arrangement is depicted in FIG. 5, which will be discussed in more detail hereinbelow.

As noted hereinbefore, the method makes use of a magneto-optical trap (MOT). The MOT system was developed in the 1980s and it is now a common apparatus. The MOT is an essential stage in preparation of cold atoms. It consists of three pairs of mutually orthogonal counter-propagating circularly polarised laser beams, which intersect at a region with a quadrupole magnetic field. The MOT laser frequencies are typically tuned to a value lower than the resonance frequency of a cooling transition in the atom (typically $-2\ \Gamma$ to $-0.5\ \Gamma$, where $\Gamma$ is the linewidth of the transition). In presence of an atomic vapour, slow atoms entering the MOT region are further slowed down by the lasers, leading to the cooling of the atoms. The quadrupole magnetic field together with the laser beams further imposes a position-dependent force that traps the cold atoms, leading to an accumulation of cold atoms in the MOT. However, fast moving atoms from the vapour can also enter the MOT region. These atoms can potentially knock out some cold atoms from the trap, leading to a loss of atoms in the MOT. In a typical operation, these two competing mechanisms reach a balance, leading to a steady state MOT of cold atoms.

The MOT is formed in part with three pairs of orthogonal laser beams intersecting at the centre of a quadrupole magnetic field. The frequency of the MOT laser beams are tuned close to the resonance of a cooling transition, with a negative detuning. Considering a cooling transition with the following parameters: wavelength ($\lambda$), linewidth ($\Gamma$) and saturation intensity ($I_s$). For transitions that are not closed, repumping lasers are required depending on the specific properties of the atom. Typical parameters are described below.

MOT laser wavelengths: ultraviolet, optical or near infrared wavelengths depending on the atom (230 nm-1500 nm)

MOT laser intensity range per beam: 0.2 $I_s$ to 2 $I_s$

MOT beam diameter: >0.5 cm

MOT laser frequency detuning range: $-10\Gamma$ to $-0.5\Gamma$

MOT magnetic field gradient/detuning in MHz: 0.5 to 2.5 G/cm/MHz

As will be appreciated, the magneto-optical trap is formed in part within the vacuum chamber by three pairs of mutually orthogonal laser beams, each of which has a wavelength corresponding to a cooling transition of the elemental metal sample. For example, each of the lasers may have a wavelength of from 230 to 1,500 nm, such as from 300 to 1,000 nm. Additionally or alternatively, the three pairs of orthogonal laser beams may have a total power of from 50 to 1,000 mW.

As will be appreciated, the MOT's parameters will be adjusted to suit the elemental metal atoms that are to be trapped. A listing of suitable parameters for a number of the elemental metal samples mentioned herein is provided below in Table AA.

TABLE AA

| Element | Cooling transition | Wavelength | Linewidth | Saturation Intensity |
|---|---|---|---|---|
| Lithium | $2s\ ^2S_{1/2} \rightarrow 2p\ ^2P_{3/2}$ | 671 nm | 5.9 MHz | 2.6 mW/cm$^2$ |
| Magnesium | $3s^2\ ^1S_0 \rightarrow 3s3p\ ^1P_1$ | 285.2 nm | 80 MHz | 446 mW/cm$^2$ |
| Calcium | $4s^2\ ^1S_0 \rightarrow 4s4p\ ^1P_1$ | 422.8 nm | 34.6 MHz | 55 mW/cm$^2$ |
| Strontium | $5s^2\ ^1S_0 \rightarrow 5s5p\ ^1P_1$ | 460.9 nm | 32 MHz | 42 mW/cm$^2$ |
| Barium | $6s^2\ ^1S_0 \rightarrow 6s6p\ ^1P_1$ | 553.7 nm | 18 MHz | 14.1 mW/cm$^2$ |
| Ytterbium | $6s^2\ ^1S_0 \rightarrow 6s6p\ ^1P_1$ | 398.9 nm | 29 MHz | 60 mW/cm$^2$ |
| Europium | $4f^7(^8S^o)5d(^9D^o)6s\ a^{10}D^o{}_{13/2} \rightarrow 4f^7(^8S^o)5d(^9D^o)6p\ z^{10}F_{15/2}$ | 583 nm | 8.2 MHz | 5.4 mW/cm$^2$ |
| Dysprosium | $4f^{10}6s^2\ ^5I_8 \rightarrow 4f^{10}(^5I_8)6s6p(^1P^o{}_1)(8, 1)^o{}_9$ | 421 nm | 32.2 MHz | 56.5 mW/cm$^2$ |

TABLE AA-continued

| Element | Cooling transition | Wavelength | Linewidth | Saturation Intensity |
|---|---|---|---|---|
| Holmium | $4f^{11}6s^2 \rightarrow 4f^{11}6s6p(^1P)$, J = 17/2 | 410.5 nm | 32.5 MHz | 61.4 $mW/cm^2$ |
| Thulium | $4f^{13}(^2F^o)6s^2$, J = 5/2 $\rightarrow 4f^{12}(^3H_5)^5d_{3/2}6s^2$, J = 9/2 | 410.6 nm | 10 MHz | 34 $mW/cm^2$ |
| Chromium | $3d^5(^6S)4s\ a^7S_3 \rightarrow 3d^5(^6S)4p\ z^7P^o{}_4$ | 425.6 nm | 5 MHz | 8.5 $mW/cm^2$ |
| Indium | $5s^25p\ ^5P_{3/2} \rightarrow 5s^25d\ ^5D_{5/2}$ | 325.7 nm | 20.7 MHz | 78.3 $mW/cm^2$ |
| Erbium | $4f^{12}6s^2\ ^3H_6 \rightarrow 4f12(^3H_6)6s6p(^1P_1{}^o)\ (6, 1)_7{}^o$ | 400.9 nm | 36 MHz | 101 $mW/cm^2$ |

As an example, the MOT parameters in respect of strontium-88 as the elemental metal sample will be discussed in more detail. The cooling transition of strontium is at 461 nm, with a linewidth of $\Gamma/2\pi=32$ MHz. Each MOT beam has a power of 30 mW, which totals to a power of 180 mW. For a beam diameter of 18 mm, the total intensity is about 35 $mW/cm^2$, slightly smaller than the saturation intensity of 43 $mW/cm^2$. This is with the typical intensity range for a MOT operation. The frequency of the MOT beams is set at a frequency detuning of $-38$ MHz$=-1.2\Gamma/2\pi$ relative to the resonance frequency of the cooling transition. While the condition for optimal laser cooling is achieved at a detuning of $-\Gamma/2$, the larger detuning allows faster moving (hotter) atoms to be captured in the MOT. The typical magnetic field gradient required for a strontium 461 nm MOT is around 50 G/cm. The magnetic field is distributed like a quadrupole field, and can be generated by using either electromagnets or permanent magnets. Usually, a pair of electromagnetic coils in anti-Helmholtz configuration is used to produce the required magnetic field of the MOT. The electromagnet has the advantage that the magnetic fields can be turned on and turned off on-demand. For our demonstration in the examples below, we use instead a total of thirty-two NdFeB permanent magnets arranged on the eight vertices of a cuboid to generate the required quadrupole field. However, as will be appreciated, an electromagnetic coil system may be used instead to provide the MOT.

Production of cold gases generally requires a vacuum apparatus with two parts; a controlled atomic source on one end, and a low-pressure optical chamber on the other end. The latter ensures negligible thermal contact between the cold gas and the environment. However, such setups are usually bulky, complicated and suitable only for few atomic species, thus restraining the development and potential applications of cold gases.

In a second aspect of the invention, there is provided an apparatus for capturing cold elemental metal atoms, the apparatus comprising:

- a vacuum chamber;
- an apparatus that generates a magneto-optical trap within the vacuum chamber;
- an ablation laser; and
- an elemental metal sample holder, wherein the elemental metal sample holder is situated within the vacuum chamber at a location that does not require the ablation laser to pass through the magneto-optical trap.

The apparatus of FIG. 1 described above is such an apparatus. However, apparatus of FIG. 1 could experience a slow deposition of strontium on the glass window (not shown in FIG. 1) where the ablation laser is sent into the vacuum chamber. This may lead to a gradual attenuation of the ablation laser power, and affect the maximum vapour pressure that is released during the ablation process. The apparatus of FIG. 5 could overcome this limitation, which will now be discussed in more detail below. As depicted, the apparatus 200 of FIG. 5 includes:

- a vacuum chamber 240;
- an apparatus 200 that generates a magneto-optical trap 230 within the vacuum chamber;
- an ablation laser 270; and
- an elemental metal sample holder 260, wherein the elemental metal sample holder 260 is situated within the vacuum chamber 240 at a location that does not require the ablation laser 270 to pass through the magneto-optical trap.

As with the apparatus of FIG. 1, the vacuum pump is not depicted, but the connection to the ultra high vacuum pump is shown in the figure. The apparatus that generates the magneto optical trap may be formed by six lasers (four of which are depicted as 210 in FIG. 5) arranged in line with the conventional placement of such lasers in such a configuration. Two of the lasers are normal with the plane of the paper and so are not depicted in the figure.

As will be noted, the elemental metal sample is placed in an elemental metal sample holder 260, which is located in a side-chamber 201 of the vacuum chamber. The viewport for the ablation laser 280 is placed away from a direct line-of-sight of the elemental metal sample, avoiding deposition of strontium on the viewport. The ablation laser beam 270 is reflected and focused onto the elemental metal sample by a mirror 250.

The apparatuses disclosed herein are compact and simple.

The invention described herein consists of a new design for atomic laser cooling and trapping. This design is based on a simple vacuum chamber where the atomic source is produced using an ablation laser that rapidly heats a small fraction of a pure metal granule at high temperature. After loading the MOT and switching off the ablation laser, the pressure goes down rapidly to secure a long lifetime of the cold atomic ensemble. This is illustrated below by the operation of the compact and ultimately portable device using strontium atoms. This newfound portability with strontium opens up the possibility of conducting inertial sensing and precision measurement experiments outdoors, such as in relativistic geodesy and metrology. A transportable source of ultracold strontium also finds potential applications in civilian defence and quantum simulation. Lastly, the ablation technique opens up laser cooling possibilities to other metal species that normally require high temperature.

Further applications of the methods and apparatus disclosed herein include outdoor precision-measurement experiments. Further, a simple source of ultracold strontium also finds potential applications in quantum computing and simulations using optical lattices and tweezers. Lastly, the ablation technique opens up unprecedented laser cooling possibilities to other elements with low saturation pressure at room temperature.

Further aspects and embodiments of the invention will now be discussed by reference to the following non-limiting embodiments.

EXAMPLES

Materials

Neodymium-iron-boron (NdFeB) permanent magnets (N750-RB) were purchased from Eclipse Magnetic Ltd. Uncoated borosilicate glass cell purchased from Precision Glassblowing of Colorado. Alfa Aesar strontium granules purchased from Fischer Scientific Pte Ltd. DCC1545M USB 2.0 CMOS Camera purchased from Thorlabs. 20 L/s ion pump purchased from Agilent Technologies, Inc. 1064 nm High power single-mode CW fiber laser from Connet Laser Technology.

Example 1. Experimental Setup

We demonstrated an approach that uses pure metallic granule as the ablation target. This design is based on a simple single vacuum chamber where the atomic source is produced using an ablation laser that rapidly heats a small fraction of a pure metal granule at high temperature. The pulse duration in this work ranged from few tens of milliseconds to few seconds, where the duration is long enough for thermal process to occur. To indicate the nature of our ablation process, we will refer to it as laser-induced thermal ablation (LITA). In the LITA process, a focused ablation laser beam strongly heats a micrometer-sized region of the granule to produce an atomic vapour. The MOT is then loaded from the vapour within the same vacuum chamber. After loading the MOT, the pressure goes down rapidly to secure a long lifetime of the cold atomic ensemble. The advantage of such an approach lies in the rapid reduction of the background vapour pressure once the ablation laser is turned off. Moreover, in contrast to oxides-based techniques, the LITA does not rely on specific chemical bonds, and can be implemented in principle to any pure solid state elements. We illustrated the operation of this simple method using strontium-88 atoms.

FIG. 1 depicts a schematic of the experimental setup. As shown, the experimental apparatus 100 includes a vacuum chamber 110, a strontium granule 120, an ablation laser 130, a CMOS camera 140, and repumping lasers (not shown in FIG. 1). The vacuum chamber 110 was an uncoated borosilicate glass cell with dimensions 30 mm×30 mm×100 mm. A strontium granule 120 was loaded into one end of the glass cell 110. After a bake-out of the vacuum system, we achieved an ultra-high vacuum condition that we sustained with a 20 l/s ion pump. We used a 1064 nm Nd: YAG laser 130 to perform the LITA and release the strontium vapour. The fibre-coupled output of the laser has a single transverse mode, and a maximum power of 38 W. We focused the ablation laser beam down to a small spot of waist $w_0 \simeq 4$ μm to achieve a strong local heating effect. This ensures that the strontium vapour can be released within tens of milliseconds after the ablation laser 130 is turned on. At the same time, the ablation spot is much smaller than the centimetre-sized strontium granule 120. The granule 120 then acts as a heat reservoir to guarantee that once the ablation laser 130 is turned off, the ablation spot is rapidly cooled down to room temperature, allowing the background pressure to return to its strontium-free value.

To produce a cloud of cold atoms in a MOT from the released vapour, we used the 461 nm $^1S_0 \rightarrow {}^1P_1$ cooling transition which has a linewidth of $\Gamma/2\pi = 32$ MHz. As shown in FIG. 1, the three counter-propagating pairs of MOT beams are arranged to be mutually orthogonal and intersect at a region that is typically 60 mm away from the granules. The frequency of the MOT beams was set at a detuning of $\delta = -1.2\Gamma$ relative to the resonance frequency of the cooling transition. While the condition for optimal laser cooling is achieved at a detuning of $-\Gamma/2$, the larger detuning allows faster moving (hotter) atoms to be captured in the MOT. Each MOT beam has a power of 30 mW (which totals to a power of 180 mW) and a beam diameter of 18 mm. The total peak intensity of all six beams is 35 mW/cm$^2$, which is slightly smaller than the saturation intensity of 43 mW/cm$^2$. This is within the typical intensity range for a MOT operation. This cooling transition is not completely closed, which leads to optical pumping of the atoms to the metastable $^3P_2$ state. To recycle these atoms back to the ground state, we sent 679 nm and 707 nm repumping lasers along one of the horizontal MOT beam paths. The repumping lasers were continuously turned on. We confirmed that the MOT fluorescence signal is independent of the repumping laser powers, indicating that we suppressed the atom losses due to optical pumping.

The timing of the ablation laser was controlled from a PC through serial communication.

Vacuum Conditions

The pressure condition to operate a magneto-optical trap (MOT) is $<10^{-8}$ mbar.

Ablation Parameters

The ablation parameters depend on the target properties such as surface details, heat capacity, heat conduction coefficient, and the sublimation/boiling point. The ablation laser power and spot size are also crucial parameters. This work identified two regimes: weak and strong heating. For weak heating, we used low ablation laser power and long pulse duration, while for strong heating regime, we used short pulses at high power. The following is typical parameter range for strontium atoms:

Wavelength range: 400 nm to 2000 nm
Ablation power: 1 W to 100 W
Focused ablation spot size: 1 μm to 100 μm
Ablation duration: 0.1 ms to less than 1 s (short pulses at strong heating regime)
1 s to 3 s (long pulses at weak heating regime)

Typical MOT Parameters

The MOT was formed with three pairs of mutually orthogonal counter-propagating laser beams intersecting at the centre of a quadrupole magnetic field. The frequency of the MOT laser beams was tuned close to the resonance of a cooling transition, with a negative detuning, considering a cooling transition with the following parameters: wavelength (λ), linewidth (Γ) and saturation intensity ($I_s$). For transitions that are not closed, repumping lasers are required depending on the specific properties of the atom.

MOT laser wavelengths: ultraviolet, optical or near infrared wavelengths depending on the atom (230 nm-1500 nm)
MOT laser intensity range per beam: 0.2 $I_s$ to 2 $I_s$
MOT beam diameter: >0.5 cm
MOT laser frequency detuning range: $-10\Gamma$ to $-0.5\Gamma$
MOT magnetic field gradient/detuning in MHz: 0.5 to 2.5 G/cm/MHz

Example 2. Quadrupole Magnetic Field

The quadrupole magnetic field required for a MOT can be generated by electromagnets or permanent magnets. Conventionally, a pair of anti-Helmholtz coils is used to produce the required quadrupole magnetic field. In our example, we implemented a simpler method alternative to the conventional electromagnets to generate the MOT magnetic field gradient. We used NdFeB permanent magnets as they have strong magnetisation, are small and do not need water cooling. The arrangement of the magnets is shown in FIG. 2. Thirty-two pieces of NdFeB permanent magnets were placed in a cuboid configuration, where each of the eight vertex hosts four magnets. The magnetization was aligned along the short dimension of the magnets. The arrangement gave magnetic field gradients of ~50 G/cm along the vertical direction and ~25 G/cm in the horizontal plane. Such values are typically used to operate a 461 nm strontium MOT. In addition, our arrangement of the magnets ensures that a large optical access to the atomic cloud is available. However, the production of the MOT is not limited to the usage of permanent magnets; conventional electromagnet works as well.

Example 3. Data Analysis

We used a CMOS camera to record a temporal series of images of the cold atomic cloud with a frame rate of 50 frames per second. For each image, we removed the background light contribution that is recorded by an image taken before the ablation laser is turned on. We then fitted the recorded fluorescence images by a Gaussian profile with a non-zero offset, which is proportional to the amount of strontium vapour in the glass cell. Thus, the fit allows us to extract the temporal evolution of both the cold atoms number as well as the amount of strontium vapour in the glass cell. From these temporal profiles, we obtained the loading times and the lifetimes of the cold atoms and of the vapour.

Here, we describe how the number of atoms in the MOT was approximated from the fluorescence signal captured by a system with a detection solid angle of Ω. This work was done only on the $^{88}$Sr isotope. The cooling transition is a J=0→J=1 transition, where scattering cross section is the same for all laser polarizations. We started by considering a single atom and calculating $P_a$, which is the fluorescence power emitted by a single strontium atom into the solid angle of Ω:

$$P_a = E_p\Gamma'\frac{\Omega}{4\pi} \tag{1}$$

Here, $E_p$=hc/λ is the energy of a photon at λ=461 nm, and Γ' denotes the rate of number of photons scattered per atom. We denoted the speed of light by c and Planck's constant by h. We considered $P_a$ to be averaged over many fluorescence events of all the atoms in the MOT and assumed that its angular distribution is isotropic. Since the natural linewidth is Γ=32×2π MHz, $$\Gamma' = \frac{1}{2}\frac{s}{1+s}\Gamma = \frac{1}{2}\frac{s_0}{4\delta^2/\Gamma^2+1+s_0}\Gamma \tag{2}$$

Where $s=s_0/(4\delta^2/\Gamma^2+1)$, δ is the detuning of the MOT beams, $s_0=I_L/I_S$ is the saturation parameter and $I_S$ is the saturation intensity of the cooling transition, which is 43 mW/cm$^2$.

For our MOT beams with a total power of P and a waist of w, the total intensity is $I_L=2P/\pi w^2$. For small detection angles, we performed the approximation $$\Omega/4\pi \approx \frac{1}{2}\left(1-\cos\frac{D}{2d}\right),$$

where the camera lens diameter is D and the imaging distance is d. This leads to the following expression for $P_a$ $$P_a = E_p\Gamma'\frac{\Omega}{4\pi} = \left(\frac{hc}{\lambda}\right)\left(\frac{1}{2}\frac{s_0}{4\delta^2/\Gamma^2+1+s_0}\Gamma\right)\left[\frac{1}{2}\left(1-\cos\frac{D}{2d}\right)\right] \tag{3}$$

Finally, we divided the total MOT power detected by the camera $P_T$ by $P_a$ such that the number of atoms is therefore $N=P_T/P_a$. $P_T$ was pre-determined via calibrating the counts to a known beam power. Using this formula, we were able to estimate the number of atoms for any given fluorescence data captured by the CMOS camera in our experiments.

Example 4. Short Pulse Sequence

The shortest ablation pulse duration that we can program is 25 ms. The pulse has a rising and falling time of ~1 ms each. With this technical consideration in mind, we explored a short and a long ablation pulse sequence in Examples 4 and 5, respectively. The short pulse sequence aims to minimize the granule heating for a fast relaxation of the strontium vapour (few tens of milliseconds), and an optimum lifetime of the cold gas. For that purpose, we used the maximum available power of the ablation laser with a minimal pulse duration.

Short Pulse Sequence

In the short pulse sequence, the ablation laser was turned on for a duration of 25 ms, which is the minimum duration allowed by the laser module. We applied a maximal ablation power of 38 W.

Results and Discussion

In FIG. 3, we plotted the temporal evolution of the cold atoms number (grey triangles) and the fluorescence signal of the strontium vapour (black circles). We found a loading time of 40(10) ms, where the precision is limited by the temporal resolution of our measurement device, and measured a peak value of 1.9(4)×10$^4$ atoms in the MOT. Even though the atoms number achieved in this sequence is small as compared to conventional setups, it is likely to be sufficient for applications in optical tweezers such as quantum computing involving Rydberg atoms and clocks.

Considering that around 50% of the laser radiation is absorbed by a strontium granule with a heating volume of about 4 μm$^3$, we estimated that the temperature increases at a rate of ~10$^4$ K/s at the ablation point. This estimation indicates that strontium vapour should be released in the chamber within milliseconds of ablation time. We confirmed this order of magnitude by monitoring the vapour density through its fluorescence emission in the presence of the MOT laser beams. For example, the curve (black circles) in the inset in FIG. 3 (top panel) shows the temporal evolution of the vapour density for an ablation time of 25 ms. The black circles, showing the background fluorescence, indicate a rapid drop of the strontium vapour to zero with a characteristic time of 40(10) ms (see inset, FIG. 3 top panel). We understand that this fast decrease in strontium vapour was due to two reasons: First, the heating volume is very small with respect to the size of the granule. In absence of the ablation laser, the granule behaves as a thermal reservoir to rapidly reduce the temperature by thermal conductance. Second, the atoms in the vapour are rapidly adsorbed by the chamber walls, contributing to a pressure reduction when we turn off the ablation laser. Such rapid decay of vapour pressure is beneficial to ensure long MOT lifetimes. Since the background pressure rapidly relaxes to a strontium-free steady-state value, the cold atoms number should undergo an exponential decay. We confirmed this exponential behaviour by plotting the normalized value of the number of atoms in semi-logarithmic scale (see FIG. 3, bottom panel). We found a MOT lifetime of $\tau_N$~4.7(9) s, which is consistent with a low background pressure environment. The long lifetime of the cold atoms in the MOT is key for various interesting applications. This long lifetime is achieved thanks to the quick reduction of the vapour pressure, which minimizes the loss of atoms from the MOT by collisions.

The curve in the inset in FIG. 3 (top panel) shows the temporal evolution of the number of atoms in the MOT. We observed a loading of the MOT as soon as the vapour is present, i.e. ~10 ms after turning on the ablation laser. We calibrated the fluorescence signal, and we found a peak atoms number of $10^4$ after ~50 ms of loading, corresponding to a loading rate of $10^5$ atoms/s. This number of atoms is sufficient for some applications in quantum computing and time keeping, where large number of atoms are not usually required. Moreover, we noted that the peak atoms number reached ~25 ms after switching off the ablation laser, indicating that the optimum loading, both in terms of atoms number and minimal loading time, could be achieved considering a more sophisticated ablation time sequence.

Example 5. Long Pulse Sequence

For the long pulse sequence, we aimed to trap a larger population of atoms in the MOT. For cases where a higher number of atoms is required, we can increase the ablation pulse duration.

Long Pulse Sequence

In the long pulse sequence, the ablation laser was turned on for an ablation duration of T=3 s, and an ablation power of 20 W. A lower power was used here, as compared to the short pulse sequence, to avoid overheating of the strontium granule.

Results and Discussion

FIG. 4*a* shows the temporal evolution of the cold atoms number (grey triangles) and the fluorescence of the background strontium vapour (black circles). Under these conditions, we found a peak of $3.5(2)\times10^6$ atoms in the MOT at around 4 s after ignition of the ablation laser, which demonstrates the potential of this technique to produce larger atoms numbers.

The background fluorescence level of the strontium vapour increased with an exponential-like behaviour and with a characteristic time of 400(2) ms. The peak value of the vapour signal coincides with the time at which the laser was turned off (dashed vertical lines). After the laser was turned off, the vapour decreased with an exponential-like behaviour again and with a characteristic time of 2.50(1) s. The number of atoms in the MOT follows a similar qualitative trend. More precisely, during the ablation, the number of atoms increases with time until it reaches a peak value around one second after the ablation laser is turned off. Due to the long ablation duration, the granule stays hot, and the strontium vapour is not removed immediately after the ablation laser is turned off, allowing the loading of the MOT to carry on until the strontium vapour becomes sufficiently low (~10 s). At longer times (10-20 s), we found an expected exponential decay with a lifetime of $\tau_N$~4.2(9) s, in agreement with the lifetime measured in the short pulse sequence in Example 4.

We systematically studied the performance of the long pulse sequence (with laser power at 20 W) in terms of the peak atoms number and loading time. The loading time is defined as the time taken to reach the peak atoms number value after ignition of the ablation laser. FIG. 4*b-c* show the values for ablation duration, ranging from T=2 s to T=4 s. We observed that the peak atoms value saturates for T≥2.5 s, whereas the loading time increases with T. These results suggest that a larger strontium vapour background, obtained with larger T, does not help to increase the atoms numbers and to some extent can be detrimental since it increases the loading time.

To get a better understanding of the mechanisms at play at longer pulse duration, we showed in FIG. 4*d* the temporal evolution of the cold atoms number (grey triangles) and the fluorescence of the strontium vapour (black circles) for an ablation duration of T=4 s. FIG. 4*d* shows a striking feature of a dip in the atoms number temporal profile, when the strontium vapour is going to reach its peak value. This indicates that the background pressure became too high such that the loss rate due to thermal atom-cold atom collisions surpasses the cooling rate of the MOT. The increasing of atoms in the MOT resumes after switching off the ablation laser, i.e. after a reduction of the background pressure.

Thus, we demonstrated a simple and compact approach to operate a magneto-optical trap using the LITA technique as an atomic source. With a short pulse sequence, we obtained a short loading time of 40(10) ms, followed by a rapid decay of the strontium vapour to maintain an ultra-high vacuum environment for a subsequent manipulation of the cold gas. With a long pulse sequence, we reported up to 3.5 million cold strontium atoms, which is over 100 times more atoms than the short pulse regime. Our results serve as a stepping stone towards even more compact and portable setups.

Example 6. Apparatus Design

We placed the viewport for the ablation laser away from a direct line of sight from the strontium solid. One pair of beams is normal to the page and centred on the chamber. FIG. 5 depicts the apparatus design. As shown, the apparatus 200 includes MOT lasers 210, windows 220, cold atoms in a MOT 230, a UHV chamber 240, a mirror 250, an elemental metal sample holder 260, and an ablation laser 270.

The working principle of the ablation is the same as the one in FIG. 1. The mirror 250 reflects the beam onto the strontium granules, allowing the viewport for optical feedthrough to be situated away from a direct exposure to the strontium vapour that is released during the thermal ablation process. This avoids deposition of strontium on the viewport that could attenuate or block the ablation laser. While deposition on the mirror is possible, the reflectance of the mirror is not significantly affected, resulting in a more reproducible ablation process.

The invention claimed is:

1. A method of generating and trapping laser cooled metal atoms in a magneto-optical trap, the method comprising:

(a) providing an apparatus comprising:

a vacuum chamber;

a magneto-optical trap arranged to be generated within the vacuum chamber; and an ablation laser;

(b) placing an elemental metal sample within the vacuum chamber and then generating a vacuum within the vacuum chamber;

(c) irradiating the elemental metal sample with the ablation laser to generate an atomic vapour formed of elemental metal atoms from the elemental metal sample; and (d) trapping a plurality of the elemental metal atoms in the magneto-optical trap, wherein:

the wavelength of the ablation laser is from 400 to 2,000 nm;

the ablation laser has a power of from 1 to 100 W; and a duration of the irradiation is from 0.1 ms to 5 seconds.

2. The method according to claim 1, wherein one or both of the following apply:

the ablation laser has a power of from 1 to 30 W; and the duration of the irradiation is from 100 ms to 5 seconds.

3. The method according to claim 2, wherein one or both of the following apply:

the ablation laser has a power of from 15 to 20 W; and the duration of the irradiation is from 2.5 to 3 seconds.

4. The method according to claim 1, wherein the total number of metal atoms trapped is in the order of from $1\times10^6$ to $1\times10^7$.

5. The method according to claim 1, wherein one or both of the following apply:

the ablation laser has a power of from greater than 30 to 100 W; and the duration of the irradiation is from 0.1 ms to less than 1 second.

6. The method according to claim 5, wherein one or both of the following apply:

the ablation laser has a power of from 32 to 75 W; and the duration of the irradiation is from 1 ms to 100 ms.

7. The method according to claim 6, wherein one or both of the following apply:

the ablation laser has a power of from 34 to 50 W; and the duration of the irradiation is from 5 ms to 50 ms.

8. The method according to claim 7, wherein one or both of the following apply:

the ablation laser has a power of from 35 to 40 W; and the duration of the irradiation is from 10 ms to 30 ms.

9. The method according to claim 1, wherein the total number of metal atoms trapped is in the order of from $1\times10^3$ to $1\times10^5$.

10. The method according to claim 1, wherein the elemental metal sample is selected from one of group 13 (group III) elements, alkali metals, alkaline earth metals, lanthanides, and transition metals.

11. The method according to claim 10, wherein the elemental metal sample is selected from indium, lithium, sodium, magnesium, calcium, strontium, barium, radium, europium, dysprosium, erbium, holmium, thulium, ytterbium, titanium, chromium, iron, and ruthenium.

12. The method according to claim 11, wherein the elemental metal sample is strontium.

13. The method according to claim 1, wherein the ablation laser has a wavelength of from 500 to 1,500 nm.

14. The method according to claim 1, wherein the ablation laser generates an ablation spot on the elemental metal sample, where the ablation spot has a size of from 1 to 100 μm.

15. The method according to claim 1, wherein the vacuum chamber provides a vacuum that is less than or equal to $1\times10^{-8}$ mbar.

16. The method according to claim 1, wherein the ablation laser has direct line-of-sight to the elemental metal sample.

17. The method according to claim 1, wherein the ablation laser is redirected and focused onto the elemental metal sample by a mirror situated within the vacuum chamber.

18. The method according to claim 1, wherein the magneto-optical trap is formed in part within the vacuum chamber by three pairs of mutually orthogonal laser beams, each of which has a wavelength corresponding to a cooling transition of the elemental metal sample.

19. An apparatus for capturing cold elemental metal atoms, the apparatus comprising:

a vacuum chamber;

an apparatus that generates a magneto-optical trap within the vacuum chamber;

an ablation laser; and an elemental metal sample holder, wherein the elemental metal sample holder is situated within the vacuum chamber at a location that does not require the ablation laser to pass through the magneto-optical trap.

20. The apparatus according to claim 19, wherein the vacuum chamber has a protruding housing which houses the elemental metal sample holder and a mirror, where the mirror is situated in the line of sight of a laser beam from the ablation laser such that it can direct and focus the laser beam onto an elemental metal sample when the apparatus is in use.

* * * * *